United States Patent [19]

Leiber

[11] Patent Number: 4,645,272
[45] Date of Patent: Feb. 24, 1987

[54] BRAKE BOOSTER

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 730,540

[22] Filed: May 6, 1985

[30] Foreign Application Priority Data

Jun. 2, 1984 [DE] Fed. Rep. of Germany ....... 3420686

[51] Int. Cl.⁴ .............................................. B60T 8/02
[52] U.S. Cl. .................................... 303/119; 303/100; 303/113; 303/116
[58] Field of Search ............... 303/100, 111, 116, 113, 303/105, 106, 119

[56] References Cited

U.S. PATENT DOCUMENTS

| 3,980,346 | 9/1976 | Leiber | 303/100 |
| 4,141,595 | 2/1979 | Leiber | 303/116 |
| 4,143,514 | 3/1979 | Leiber | 60/534 |
| 4,346,944 | 8/1982 | Leiber | 303/116 |
| 4,482,192 | 11/1984 | Leiber | 303/100 |
| 4,523,791 | 6/1985 | Belart et al. | 303/100 |

FOREIGN PATENT DOCUMENTS 2531264 1/1977 Fed. Rep. of Germany .
3151292 7/1983 Fed. Rep. of Germany .

Primary Examiner—Duane A. Reger
Assistant Examiner—Matthew C. Graham
Attorney, Agent, or Firm—Edwin E. Greigg

[57] ABSTRACT

A brake booster having one open and one closed brake circuit, in which a tight partition penetrated by a pedal tappet extension is disposed between the two pressure chambers of the brake circuits. During normal braking, the pressure distribution from the open brake circuit to the closed brake circuit is effected via a magnetic valve capable of being switched over for the initiation of ABS regulating functions, so that it is possible to realize a simultaneous control of pressure in both brake circuits for both normal braking and for the realization, by the simplest means, of ABS functions is possible.

9 Claims, 2 Drawing Figures

BRAKE BOOSTER

BACKGROUND OF THE INVENTION

The invention is based on a brake booster as defined hereinafter.

Brake boosters, includes multi-circuit brake boosters, such as shown by (German Offenlegungsschriften Nos. 25 31 264 and 31 51 292). These known brake boosters may be embodied such that one brake circuit is closed and the other brake circuit is generally an open brake circuit. The open brake circuit is acted upon directly by a reservoir pressure, which is derived from a pressure supply means and directed to the brake circuit via a control valve or brake valve. If the pressure supply means fails, the open brake circuit becomes a closed brake circuit. Generally the open brake circuit includes an annular piston, which is mounted on a pedal tappet actuated by the brake pedal. A need exists for brake boosters which are combined with an anti-skid or anti-lock system (ABS) and included in the ABS concept in such a way that as an integrated component they can also be used, at least indirectly, for ABS functions. In this way, while maintaining acceptable anti-skid system performance, it is possible to attain a combined brake booster and anti-skid system at considerably reduced cost, in terms of both materials and engineering expense.

OBJECT AND SUMMARY OF THE INVENTION

The brake booster according to the invention has the advantage that it is possible to control the pressure in two brake circuits in common. In the ABS case, that is, if some arbitrary ABS signal appears, pressure control for both brake circuits is switched over to regulated (i.e., feedback control) operation, using only a single ABS magnetic valve and affording the opportunity, which is provided by the invention, of subjecting one brake circuit to an ABS pressure modulation via the brake booster by means of the output of this ABS valve which is incorporated into the other brake circuit. Thus the booster becomes an integral component of the anti-lock system as well, enabling the hydraulic booster to be used in a dual manner, both for brake boosting during normal operation and for ABS pressure modulation if wheel locking is sensed.

A fully functional combination of a brake booster with the anti-lock system or ABS of this kind is particularly applicable, while maintaining entirely acceptable performance, in vehicles with a low top speed or for vehicles in countries having speed limits. The invention enables a drastic reduction in the number of regulating channels—that is, in the number of ABS components, including rpm sensors and extending to the magnetic valves—yet on the other hand maintains full roadholding, steering and braking travel as compared with normal brakes. In the simplest sensor configuration it requires only a single rpm sensor at the front axle differential (in the case of front-wheel-drive vehicles) and one sensor on one of the two rear wheels. The brake booster and ant-skid system combination is preferably suitable for vehicles with a diagonal brake circuit distribution, in which the second, unsensed (rear) wheel is supplied with the pressure level of the adjacent, regulated wheel via an additional hydraulic valve arrangement.

By means of the invention, the pressure is controlled for both wheels in common, for example at the front axle; the same applies to the rear axle. In such a case, only one 3/2-way magnetic valve is required as the ABS valve component for the open brake circuit; in the ABS case, this magnetic valve delivers the pressure of the associated brake booster circuit to the corresponding wheel cylinder, yet at the same time it allows this pressure to reach the primary side of the main brake cylinder for the closed brake circuit as well. For normal operation, that is, without ABS operation, a normally open 2/2-way magnetic valve is connected in parallel to this valve configuration. This parallel two-position valve then has the task of delivering pressure medium to the respective wheel circuits without delay upon braking during normal operation, while upon the closure of this valve during ABS operation a switchover of pressure gradients and a transition to regulated operation (pressure modulation) can be realized. It is then possible, in the conventional manner, to embody the course of the regulated pressure over time during the regulating cycles arbitrarily; for instance, the pressure may take a sawtooth-like course.

A particularly advantageous feature is the control of the pressure buildup, in the event of ABS operation, in accordance with known regulation algorithms, but augmented by the signal of a linear regulating system travel transducer which detects the displacement of the main brake cylinder piston, because the relative variation in piston travel corresponds to a relative pressure variation in the brake circuit. To regulate the rear axle, a simple 2/2-way magnetic valve can then be used and associated with the brake circuit, which is acted upon by the output of the first (open) brake circuit, or by the ABS magnetic valve following it, to produce a sort of "secondary pressure buildup". The ABS pressure modulation or pressure regulation is then effected for the rear axle using a followup control valve which is also provided.

The invention will be better understood and further objects and advantages thereof will become more apparent from the ensuing detailed description of preferred embodiments taken in conjunction with the drawings.

DESCRIPTION OF THE PREFERRED EMBODIMENTS

The basic concept of the present invention is to enable pressure to be controlled simultaneously in two brake circuits by providing at the output of a first (open) brake circuit an ABS magnetic valve triggered for ABS operation by corresponding signals, the output of the ABS magnetic valve being carried both to the associated manual brake cylinder and to the primary main brake cylinder piston of the second (closed) brake circuit.

Layout of the First Exemplary Embodiment

Figure 1:
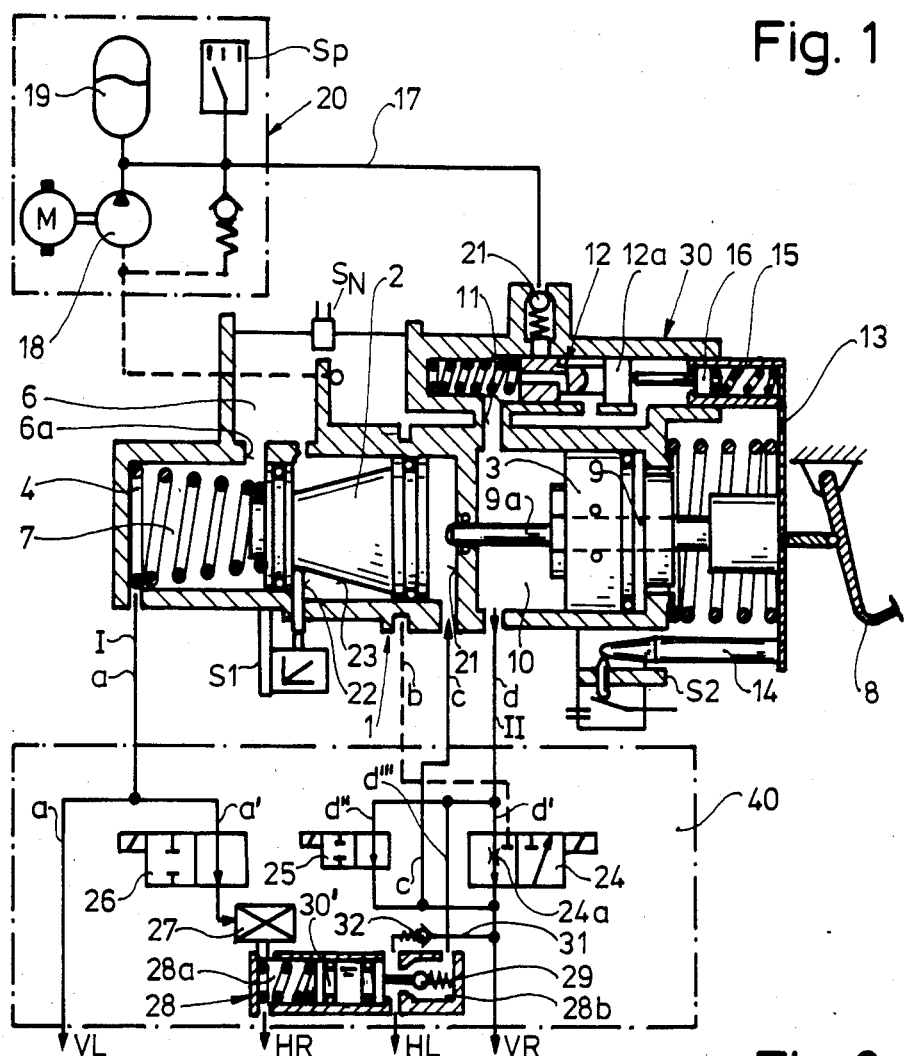
FIG. 1 illustrates a first exemplary embodiment by means of a very simplified circuit layout.

The brake booster shown in FIG. 1 includes a dual-circuit main cylinder 1, in which two pistons 2 and 3 are disposed in line with one another. It will be understood that the brake booster shown by way of example in FIG. 1 does not restrict the applicability of the present invention, which contrarily is applicable to all possible forms of brake booster embodiment, either with or without a travel simulator device, in which at least one brake cylinder piston is movable upon brake pedal actuation, pressure being directed into the system from an external pressure source.

The front main brake cylinder piston 2 is fixed in the position shown in the drawing by a restoring spring 4 in the conventional manner and thus simultaneously keeps a connection (relief port 6a) open between a supply or refill container 6 and the main cylinder work chamber 7. Connected to this chamber, as shown, is a first, so-called closed brake circuit I, the connecting line being indicated by reference letter a.

The overall system shown in FIG. 1 includes a pressure supply 20, the hydraulic brake booster 30 and a valve block 40 for the ABS functions, which is connected following the brake booster 30. For normal braking operation as well, the pressure supply to the various wheel brake cylinders VL (front left), HR (rear right), HL (rear left) and VR (front right) is effected via the ABS magnetic valves. The ABS multi-way magnetic valves communicating with the various wheel brake cylinders are described in further detail hereinafter; it should be noted that in general, they are designed such that depending on the characteristics of the road surface, or in other words on the wheel behavior sensed by well known wheel sensors, they adapt the brake pressure accordingly in the two brake circuits I and II, or distribute it as needed among the individual wheels, taking into account an electronic logic circuit which is supplied with input signals from the wheel sensors.

The second piston 3 in the main cylinder 1 is an annular piston, through which a pedal tappet 9 actuated by the brake pedal 8 passes. The annular piston is displaceably disposed in its associated portion of the main brake cylinder and with its inner face it defines a chamber 10, which is connected via a conduit 11 to a brake valve, or control valve 12 of the brake booster. In the illustrated exemplary embodiment, the control valve 12 is located outside the axis of the tandem main brake cylinder 1 but axially parallel thereto. The actuation of both the control valve and the pedal tappet is effected at the brake pedal via a plate 13, to which a pin 14 capable of cooperating with a switch S2 for position determination (position monitoring) may also be secured. The plate 13 also supports a slide 16, which is resiliently supported via a travel-limiting spring 15, for actuating the control valve 12 with the valve slide 12a, so that the known function of a travel simulator is provided here by means of appropriately feeding the supply pressure, derived from the pressure supply 20, into the work chamber 10 of the open brake circuit. The pressure supply means 20 includes a pump 18 with a reservoir 19. The reservoir pressure reaches a check valve 21 on the brake valve 12 via a hydraulic connecting line 17 which permits fluid flow away from the reservoir only.

A further important feature of the brake booster shown in FIG. 1 is that a rod-like continuation 9a of the pedal tappet 9 penetrates an internal, pressure-tight partition 21 between the two main brake cylinder pistons, which belong to different brake circuits, so that for instance if the pressure supply should fail, then as the pedal continues to be actuated, so that mechanical action can be exerted upon the front main brake cylinder piston 2. To detect the movement of this main brake cylinder piston 2, a touch probe 22 is also provided, which travels on an oblique piston surface 23 and actuates a correspondingly associated switch S1, which may also be embodied as an analog position transducer having an electrical output signal. The remaining layout will be described below in connection with an explanation of the mode of operation of the system.

MODE OF OPERATION—NORMAL BRAKING

The brake pressure directed into the system in proportion to the pedal force by the brake valve 12 travels via the brake chamber 10 into the line d of the brake circuit II and further via a parallel branch line d' and d" to the associated wheel brake cylinder VR, which for the sake of simplicity will be identified by the same symbol as the wheel belonging to it. The respective branch line portions d' and d" are located in the path of respective magnetic valves 24 and 25; magnetic valve 25 functions as a blocking valve which either permits fluid flow or blocks fluid flow. Magnetic valve 24 permits fluid to flow to the brakes or else returns the fluid over return line b. Valve 24 is shown in the prior art in U.S. Pat. No. 4,155,604 and the magnetic valve 24 has a throttle restriction 24a, which in the illustrated normal braking position (that is, without ABS operation) is substantially inoperative. All the various magnetic valves in FIG. 1 are otherwise shown in their positions for normal braking operation. Via a line c, fluid is returned to the main brake valve pressure chamber from the output of the magnetic valve 25, and from the output of the magnetic valve 24 via a throttle restriction 24a as well. The same input brake pressure forced from chamber 10 by the foot pedal operation reaches the primary side of the main brake cylinder piston 2 of the closed brake circuit I, so that the wheel brake cylinder VL is acted upon accordingly via the line a, while the wheel brake cylinder HR is acted upon as well via a branch line a', an interposed fluid blocking magnetic valve 26, (valve 26 is the same as valve 25 and either passes fluid or blocks fluid flow) a standard pressure regulator 27 for the rear axle region and one side 28a of a followup control valve 28. Then, as the drawing shows, the brake pressure fed into the pressure chamber 10 by the brake valve 12 is delivered directly to the wheel brake cylinder HL via the other half 28b of the followup control valve 28 and via an additional branch line d'''.

A corresponding pressure reduction for the rear axle region in the instance of normal braking is then attained by the action of the standard pressure regulator 27 and by the closing action, hereby attained for the wheel brake cylinder HL as well, of a ball valve 29 in the second half 28b of the followup control valve. If the pressure on the left side of the followup control valve 28, as seen in the drawing, drops, then a corresponding pressure reduction takes place for the wheel brake cylinder HL as well, as a result of the closure action of the valve 29 brought about in the followup control valve 28 by a movement of the piston 30' to the left which restricts flow through valve 29.

It will also be apparent that the braking effects are still maintained during emergency operation if the reservoir pressure should fail, because braking pressure can be generated in all the lines both via the actuation of the tappet 9a, which acts through the partition 21 upon the main brake cylinder 2 of the closed brake circuit I, and as a result of the coupling of the main brake cylinder piston 3 for the open brake circuit II with the tappet 9 via an enlarged end portion adjacent the plate 13.

In the illustrated exemplary embodiment the magnetic valves forming the ABS valve block 40 are otherwise embodied such that the magnetic valve 25 is a 2/2-way switchover valve, the magnetic valve 24 is a 3/2-way magnetic valve, and the magnetic valve 26 is a 2/2-way magnetic valve. Such magnetic valves are well known in the prior art. This specialized embodiment is described for the sake of better comprehension of the ABS functions described below; it must not be considered to limit the invention and is descriptive in terms of the invention solely of the functions generated by these valves. The magnetic valves are connected to the outputs of the wheel sensors, not shown, and are controlled by operation of the wheel sensors.

MODE OF OPERATION—ABS FUNCTIONS

At the beginning of a braking operation and during partial-braking operations, the two-position magnetic valve 25 located parallel to the 3/2-way ABS pressure regulating valve 24 directs pressure medium without delay to the wheel brakes. As soon as an ABS regulating signal initiates braking regulation, for instance during full-braking operations, the two-position valve 25 is triggered, so that it blocks fluid flow to the wheel brakes. The brake fluid now travels exclusively from the ABS regulating valve 24, embodied as a 3/2-way magnetic valve, to the static brake circuit I, which acts upon the wheel brakes VL and HR [left front and right rear], as well as to the wheel brakes VR and HL [right front and left rear] belonging to the dynamic brake circuit II. By means of the throttle restriction 24a built into the ABS regulating valve, the speeds of pressure increase in the wheel brakes VL, HR, HL and VR are limited, which is very advantageous in regulating braking.

By means of the ABS regulating valve 24, the braking pressures of the front wheel brakes VL, VR are regulated in common, with a slow pressure increase alternating with a slow pressure decrease. An rpm sensor, disposed for instance on the front axle differential in the case of front-wheel-drive vehicles, suffices to control the valves 24 and 25 via an electronic control unit well known in the prior art to regulate the pressure in the two front wheel brakes VL and VR. If the magnetic valve 24 is excited and the pressure in the front wheel brakes VL, VR thus decreased, the main cylinder piston 2 moves toward the right; its travel is measured by the travel transducer S1, which has a linear characteristic. Knowing the characteristic pressure/volume curve of the associated wheel brake, the pressure change in the front wheel brakes can be determined with the aid of the [piston] travel measurement. Thus the front wheel braking pressure change can be detected indirectly. This detection of the front wheel braking pressure change is useful in order to optimize the brake regulation, because the quality of brake regulation can be improved if the front wheel brake pressure is used as an auxiliary regulating variable.

Figure 2:
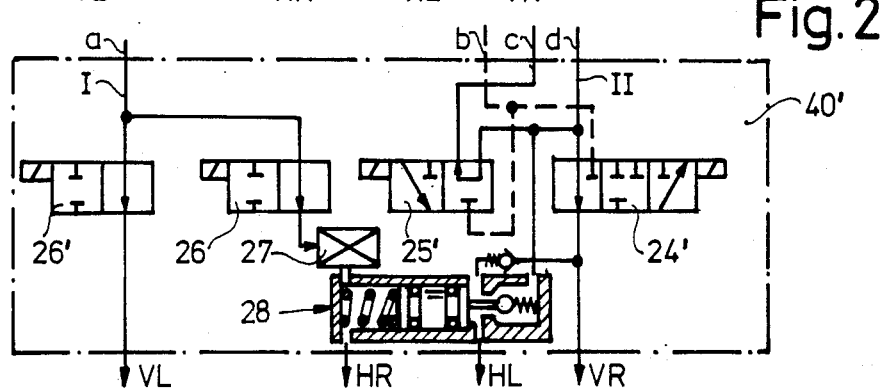
FIG. 2 shows a more complicated embodiment of the ABS valve block, which in this exemplary embodiment replaces the ABS valve block of FIG. 1 and is connected following the brake booster.

In FIG. 2, instead of the simple magnetic valves 24, 25 of FIG. 1, other valves are provided: The ABS magnetic valve 24 is replaced by a 3/3-way magnetic valve 24', with which the pressure in the wheel brakes VR and HL can be increased, kept constant or reduced during braking regulation.

The 2/2-way magnetic valve 25 is replaced by the 3/2-way magnetic valve 25', with which the pressure on the primary side of the piston 2 and thus in the static brake circuit I as well can be increased or decreased.

The pressure maintenance function in the wheel brake VL is attained here with the 2/2-way magnetic valve 26', which in the non-excited state connects the main cylinder chamber 7 with the wheel cylinder chamber VL, but in the excited state it interrupts this connection, so the pressure in the wheel brake cylinder then remains constant. In this variant as well, the pressure in both front wheel brakes can be regulated in common with an rpm sensor on the front axle differential of a front-wheel-drive vehicle.

For ABS regulation of the rear axle, the 2/2-way valve 26 and the followup control valve 28 are used, in addition to the 3/2-way magnetic valve 24 that regulates the pressure in the brake circuit I (main cylinder chamber 7) in accordance with the signals of the front axle differential rpm sensor.

If the front wheels have lower wheel-lock or skid pressures than the rear wheel, then regulating the rear wheels solely with the aid of the 3/2-way magnetic valve 24 is all that is required. If the rear wheels have a lower wheel-lock or skid pressure than the front wheels, however, due for instance to front wheel brake fading, then the 2/2-way magnetic valve 26 is triggered as well, by means of rpm sensor signals prepared in the electronic control unit, so as to limit the braking pressure in the right rear wheel brake HR and to overcome the tendency to locking or skidding on the part of the right rear wheel.

The pressure maintenance phase in the wheel brake HR effected with the triggering of the 2/2-way magnetic valve 26 is also realized in the left rear wheel brake HL with the aid of the followup control valve 28: As soon as the 2/2-way magnetic valve 26 closes, the pressure force in the chamber 28b displaces the piston 30' of the followup control valve 28 toward the left, because of the still-rising pressure in the chamber 28b, so that the ball seat valve 29 closes. As a result, a further increase of pressure in the wheel brake HR is prevented, and the pressure therefore remains at a constant level.

In the exemplary embodiment according to FIG. 1, a connecting line 31, having a check valve 32 which opens toward the right chamber 28b of the followup control valve 28, is also disposed beginning at the output of the 3/2-way magnetic valve 24. By means of this check valve 32, this ball seat valve 29 is now bypassed in the event that the brake circuit I fails because of a leak and the ball seat valve 29 would accordingly close; as a result, the braking capacity of the left rear wheel brake HL is maintained. It is advantageous to arrange the check valve 32 for a maximum pressure difference, for instance approximately 30 bar, in terms of the difference in the wheel-lock or skid pressures between the front axle and the rear axle.

If an error in the system occurs, for instance a malfunction of the 3/2-way magnetic valve 24 or a short circuit of the associated power output stage, then the parallel valve 25, which is an important component of the apparatus according to the invention, is always opened, by means of a corresponding plausibility logic system, causing the full control pressure determined by the brake valve 12 to reach the wheel brake cylinders.

Furthermore, in accordance with one embodiment the output signal of the position transducer S1 at the main brake cylinder can be used as an additional auxiliary signal for regulating the front axle, such that the pressure level of the so-called low wheel is detected by this position transducer and evaluated in order to set the velocity-dependent pressure level of the so-called high wheel with a switchover from "select low" to "high", since in this simplified system the pressure level of the high wheel cannot be fed in fully, so as to prevent the yawing moment from becoming too great.

An embodiment of the basic concept of the invention in the vicinity of the valve block which is attainable with a very few additional components is shown in FIG. 2, in which the valve block is marked 40′. In this exemplary embodiment, which includes a definite pressure maintenance position for the magnetic valves participating in the ABS functions, the main ABS magnetic valve for the front axle region is marked 24′ and embodied as a 3/3-way magnetic valve, while the parallel valve 25′ is simultaneously embodied as a 3/2-way valve. Furthermore, a 2/2-way magnetic valve 26′ is also disposed in the pressure line a leading to the wheel brake cylinder VL.

It is apparent in this structure that the pressure reduction in the two regulating channels for the front axle region VR and VL can be effected in accordance with the ABS control signal solely by means of triggering and actuating the 3/3-way magnetic valve 24′; if the pressure reduction is to be effected in only one of the regulating channels, then the additional 2/2-way magnetic valve 26′ is switched over into the maintenance 25′, now equipped as a 3/2-way magnetic valve, in the position. Furthermore, by including the parallel valve ABS function course, a pressure reduction for the brake circuit I can be effected by switching this valve 25′ over, whereupon a corresponding parallel or subsequent triggering of the 2/2-way magnetic valve 26′ effects the maintenance functions for this wheel brake cylinder VL. Here, it is advantageously possible to operate with two wheel sensors for the front axle region. The positions assumed by the various magnetic valves as shown in FIG. 2 are the positions for normal braking, that is, without ABS control signals; it will be appreciated that in this exemplary embodiment the outlet connection of the parallel magnetic valve 25′ is connected to the pressure return lines b, and in the unswitched-over position the pressure line d leading from the pressure chamber 10 is connected directly via valve 25′ to the line c leading to the primary side of the main brake cylinder piston 2 of the closed brake circuit I. The effect on the rear wheel region and the initiation of corresponding ABS functions in the exemplary embodiment of FIG. 2 corresponds to the exemplary embodiment of FIG. 1.

The foregoing relates to preferred embodiments of the invention, it being understood that other variants and embodiments thereof are possible within the spirit and scope of the invention, the latter being defined by the appended claims.

What is claimed and desired to be secured by letters patent of the United States is:

1. A brake system for a vehicle having a brake pressure source (12, 20), a pedal for controlling fluid from said brake pressure source, a master brake cylinder, a master brake cylinder Piston (2) displaceable in said master brake cylinder that can be acted upon by said fluid from the brake pressure source (12, 20), four brake lines (VL, HR, HL, VR), which lead to four different wheel brakes which receive fluid under pressure from said master brake cylinder, and of which the first brake line (VL) and second brake line (HR) are suppliable from the master brake cylinder (1), and an anti-skid apparatus, said anti-skid apparatus includes valve means (24 or 24′+25) for varying brake pressures with the aid of a pressure medium from said brake pressure source (12,20) in accordance with a rotational behavior of at least one wheel associated with said wheel brakes, said valve means (24 or 24′+25) of said anti-skid apparatus are connected to said brake pressure source (12, 20) such that the brake fluid pressure in a third brake line (VR) is variable directly and in said first brake line (VL) and second brake line (HR) are variable via said master brake cylinder piston (2);

a further valve means (26), which is embodied in the form of a 2/2-way valve, is inserted between said master brake cylinder (1) and said second brake line (HR) suppliable by said master brake cylinder for the purpose of temporarily maintaining a constant brake pressure in said second brake line (HR);

a standard pressure regulator (27) disposed following said further valve means (26) and before said second brake line (HR);

a followup control valve (28) which is embodied in the manner of a controllable check valve is connected via a control inlet to said second brake line (HR) and forms a closable connection between said brake pressure source (12, 20) and a fourth brake line (HL), wherein said control inlet opens into a control cylinder, in which a control piston loaded by an opening spring is displaceable, said control piston being subjected on one side to the pressure from said second brake line (HR) and on an opposite side to the pressure of said fourth brake line (HL), and wherein elements of said followup control valve (28) are disposed such that said followup control valve (28) opens on its own in the event of a pressure drop in a direction of the brake pressure source (12, 20); and said second brake line (HR) associated with said standard pressure regulator (27) and said fourth brake line (HL) beginning at said followup control valve (28) are associated with one axle of said vehicle.

2. A brake system for a vehicle as defined by claim 1, in which said second brake line (HR) and said fourth brake line (HL) are associated with a rear wheel axle of said vehicle.

3. A brake system for a vehicle as defined by claim 1, in which an additional valve means (26′), which is embodied in the form of a 2/2-way valve, is incorporated into said first brake line (VL) for the purpose of intermittently keeping brake fluid under constant pressure in said first brake line (VL).

4. A brake system for a vehicle as defined by claim 1, in which a valve means (24) of said anti-skid apparatus, which is connected to the brake pressure source (12, 20), is embodied as a 3/2-way magnetic valve, which in its normal position connects the brake pressure source (12, 20) with said third brake line (VR) and said master brake cylinder (1) and in a second position drops the pressure in said third brake line (VR) and said master brake cylinder (1).

5. A brake system for a vehicle as defined by claim 1, in which said 3/2-way valve (24) incorporates a throttle (24a) which is effective in a normal position of said valve (24), and that additionally a 2/2-way valve (25) is provided, which in its normal position provides a bypass around said 3/2-way valve (24).

6. A brake system for a vehicle as defined by claim 1, in which said valve means of said anti-skid apparatus is embodied as a 3/2-way valve (25′) for connecting and disconnecting said master brake cylinder (1) from said brake pressure source (12, 20), a blockable 2/2-way valve (26') is incorporated into said second brake line (VL), and that another valve means (24'), which is controllable independently from said 3/2-way valve (25'), connects said third brake line (BR) to the brake pressure source (12, 20), disconnects it therefrom, and relieves it of pressure.

7. A brake system for a vehicle as defined by claim 6, in which said valve means (24') associated with said third brake line (VR) is embodied as a 3/3-way valve.

8. A brake system for a vehicle as defined by claim 1, in which between said third brake line (VR) and the fourth brake line (HL), a pressure drop valve (32) openable toward this fourth brake line (HL) is incorporated.

9. A brake system for a vehicle as defined by claim 8, in which said pressure drop valve (32) is embodied in the manner of a check valve closable by means of a spring.

* * * * *